US00RE41225E

(19) United States
(12) Reissued Patent
Wendisch

(10) Patent Number: US RE41,225 E
(45) Date of Reissued Patent: Apr. 13, 2010

(54) METHOD OF AND AN APPARATUS FOR TESTING CONNECTIONS IN A NETWORK

(76) Inventor: Dieter Wendisch, Bosestrasse 43, Berlin (DE), D-12103

(21) Appl. No.: 11/955,256

(22) Filed: Dec. 12, 2007

Related U.S. Patent Documents

Reissue of:
(64) Patent No.: 6,975,860
Issued: Dec. 13, 2005
Appl. No.: 10/047,425
Filed: Jan. 14, 2002

(30) Foreign Application Priority Data

Jan. 26, 2001 (DE) ..... 101 03 725
May 23, 2001 (DE) ..... 101 25 382

(51) Int. Cl.
*H04W 24/00* (2006.01)

(52) U.S. Cl. ..... 455/423; 455/424; 455/67.11; 370/241; 279/1.01

(58) Field of Classification Search ..... 455/423, 455/424, 425, 67.11; 370/241; 379/1.01
See application file for complete search history.

(56) References Cited

U.S. PATENT DOCUMENTS 5,450,624 A * 9/1995 Porambo et al. ..... 455/226.4
5,590,116 A * 12/1996 Zhang ..... 370/253
6,091,950 A 7/2000 Remy ..... 455/423
6,230,006 B1 5/2001 Keenan et al. ..... 455/424
6,587,671 B1 7/2003 Kanago et al. ..... 370/241
6,724,729 B1 4/2004 Sikdar ..... 370/241
6,754,487 B1 6/2004 Sanders et al. ..... 455/423

FOREIGN PATENT DOCUMENTS

EP 0 726 664 A2 8/1996
EP 0 726 664 8/1996
WO WO 00/31963 6/2000
WO WO 00/39962 7/2000

OTHER PUBLICATIONS

Rosar, Werner, "Teststrategien Messgeräte und–systeme im GSM–Teil 1," 688 NTZ Nachrichten Technische Zeitschrift 47 No. 9, Sep. 1994, 5 pages.
Rosar, Werner, "Teststraegien Messgeräund–systeme im GSM–Teil 2," 688 NTZ Nachrichten Technische Zweitschrift 47, No. 10, Oct. 1994, 6 pages.

* cited by examiner

*Primary Examiner*—Nghi H Ly
(74) *Attorney, Agent, or Firm*—Woodcock Washburn LLP

(57) ABSTRACT

The invention relates to a method of and an apparatus for testing electronic signals in a network, comprising network units between which information can be exchanged by electronic data transmission through network connections. A plurality of testing components are coupled each to one or more of the network connections so that the testing components each can detect electronic signals relating to the electronic data transmission through the one or more network connections. To fulfill a testing task, a master-server configuration is established between at least two testing components in response to the respective specific testing task. The testing components which form part of the master-server configuration are synchronized in time to that the test signals detected can be processed in accordance with their hierarchy and dependence in time.

25 Claims, 6 Drawing Sheets

METHOD OF AND AN APPARATUS FOR TESTING CONNECTIONS IN A NETWORK

Matter enclosed in heavy brackets [ ] appears in the original patent but forms no part of this reissue specification; matter printed in italics indicates the additions made by reissue.

The invention relates to a method of and an apparatus for testing or checking network connections through which electronic data are exchanged between network elements of a network, especially between elements of a telecommunications network, or a network of traffic and transportation engineering or power engineering systems.

Typically, in a network, such as a telecommunications network a plurality of network elements are interconnected in such a way that electronic data can be exchanged by one network element with at least one other network element or with a plurality of other network elements. The exchange of data between the network elements may be accomplished by wired and/or wireless connections. As interconnections become more common between individual networks (e.g. telephone, data, multimedia networks) which originally existed as independent networks and now are growing into greater webs of networks, the forms of transmission to be utilized in such larger networks have become more varied.

In the present description the terms network and net will be used as synonyms for an arrangement of electric/electronic devices and apparatus between which electronic information can be exchanged through wireless connections and/or wired connections. For instance, a net may comprise mobile telecommunications networks for transmitting essential parts of different types of electronic information (speech, text, image, and data) between network elements via a radio net, such as mobile radiocommunications. At present, various embodiments of mobile telecommunications networks are in use, and different generations of development may be present in a single embodiment. Cellular mobile telecommunications or mobile communications networks based on radiotransmission are the mobile equivalent to fixed public networks of telecommunications, such as telephone networks or the ISDN net (Integrated Services Digital Network). Mobile communications networks are connected to the fixed networks through suitable gateways.

Other networks relate to netlike combinations of power or energy plants and transportation or traffic engineering systems which permit electronic data to be exchanged through data connections. In this context it is possible to have means and equipment from different technical fields linked in a single network.

The customary telecommunications network at the present time is a so-called second generation network or net utilizing the GSM standard (Global System for Mobile Communication). GSM networks comprise a uniform radio interface between mobile user stations and the network, and the various types of information (speech, text, image, and data) can be transmitted in the form of digital signals through this interface.

The GPRS standard (General Packet Radio Service) is a further development of the GSM standard and is distinct from the former by transmitting electronic data on a packet base within the GSM network. What this means is that, prior to transmission, the electronic information to be passed on is divided into packets which then are reassembled at the receiving station.

While transmission rates in a conventional GSM network are approximately 9.6 kbits/sec, GPRS permits a transmission bandwidth of about 150 kbits/sec per subscriber. Further essential improvement of the transmission bandwidth is expected to be achieved with the new so-called third generation of mobile communications networks (IMT2000 or UMTS offering as much as 2 Mbits/sec).

Regardless of the particular embodiment of the mobile communications network and the respective transmission standard applied, the various forms of implementation have one thing in common: a plurality of network elements communicate with one another or links between them can be formed for a limited period of time so to create a plurality of connections. This renders electronic data exchange in the respective network very complex.

The complex nature as well as the wide and dense geographic distribution of network elements make it difficult to test and examine electronic connections, especially for purposes of fault diagnosis and error location in networks via which electronic data are exchanged, with the inclusion of fixed networks and/or mobile communication networks.

It is an object of the invention to provide a method of and an apparatus for testing or checking connections in a network, especially for effective fault localization or error tracking, which will permit cost effective network verification in correspondence with any particular application.

This object is met, in accordance with the invention, by a method as defined in claim 1 and an apparatus as defined in claim 11.

It is an essential advantage of the invention, in comparison with the prior art, that testing components or checking means can be utilized flexibly to meet any particular testing task aimed at detecting and gathering test signals required to solve the testing task in question in networks, in particular networks including network elements which are located at different places remote from one another. The testing equipment available can be configured as required for any particular testing case in order to detect, record, collect and process the desired test signals. When selecting the testing components for a concrete testing task it may be convenient to take into account the location of the network where the testing component is coupled as that reveals the kind of test signal which the individual test component can or cannot supply to meet the testing task in question.

Another advantage resides in the fact that in case of failure of a testing component, other testing components in the network can be drawn upon to try and solve the testing task. To this end it may be advantageous to select the other testing components so that they will detect the same test data which would have been recorded had the failed testing component been functioning. However, it is likewise possible to have the other testing components detect test signals which are dependent on those test signals which normally would be detectable by the failed testing component.

The synchronization in time of the testing components, as included in the testing method, makes sure that the testing components which are involved in a particular testing task and which, as a rule, are distributed throughout the network will be synchronized in time for each case of application. That is important when the testing components which must cooperate to meet a specific testing task are selected and connected anew for each case of application.

According to a convenient further development of the invention a current testing task, once completed, is followed by another current testing task for which another master-server configuration is established in response to this other current testing task. The at least one other testing component is configured as a master testing component, while the one testing component is configured as a server testing component. In this manner it is assured that a master or server testing function can be assigned to a particular testing component depending on the particular case of application. Thus the testing components can be adapted individually to the respective testing or checking task to be performed.

In the case of a preferred modification of the invention the establishment of the master-server configuration in response to the current testing task and/or the establishment of the other master-server configuration in response to the other current testing task are limited to a predetermined period of time the duration of which depends on the current testing task or the other current testing task, respectively. This makes sure that testing components having fulfilled their respective functions in a testing task will not remain unnecessarily occupied for jobs done but instead will be available and free again to assume the next testing task.

According to a preferred embodiment of the invention the processing of electronic signals fulfilling different functions is improved by the provision of a synchronization connection between the master testing component and the server testing component for automatic synchronizing in time of the master testing component and the server testing component. Synchronization signals are exchanged through this synchronization connection. Test signals and synchronization signals thus can be separated easily.

An embodiment of the invention, preferred particularly in the context of a testing task for which a plurality of server testing components cooperate with a master testing component, provides for synchronization signals transmitted from the master testing component to the server testing component to comprise time standard signals so that the automatic synchronizing in time is released by the master testing component. Uniform synchronization in time of all the server testing components cooperating with the master testing component, therefore, can be guaranteed.

In a convenient embodiment of the invention synchronization in time of high-quality goods is achieved by the fact that the master testing component and/or the server testing component receive time standard signals for time synchronization, the signals being transmitted via radio connections. This permits time standard signals of standard time transmitters or satellite stations to be used.

The fields of application of the method proposed by the invention are broadened still further by advantageous embodiments providing for simulation signals to be generated and fed into the network. A convenient modification of the invention may provide for generation and supply to the net of simulation signals by means of the master testing component as well as storage in the master testing component of electronic data of the simulation signals, including associated electronic simulation signal time information in response to the previously accomplished synchronizing in time, and further may provide for the electronic data of the simulation signals stored in the master testing component to be taken into account automatically in the processing of the current electronic test signals transmitted from the server testing component to the master testing component.

Alternatively, or as a supplement, a further development of the invention provides for generation of further simulation signals by the server testing component which then are fed into the network, for electronic data of the further simulation signals, including associated electronic simulation time information in response to the previously accomplished synchronizing in time to be transmitted from the server testing component to the master testing component, and for the electronic data of the further simulation signals transmitted from the server testing component to the master testing component to be taken into account automatically in the processing of the current electronic test signals transmitted from the server testing component to the master testing component.

A preferred embodiment of the invention may include provision for electronic data of specific characteristics of the network to be taken into consideration automatically when the test connection is established and when the master-server configuration is established in response to the current testing task and/or when the further master-server configuration in response to the further current testing task is established. When resolving a concrete testing problem, it is thus possible to take into account automatically something like statistic information on the location-dependent occurrence and frequency of faults in the network. Hereby, the performance of the testing task is optimized in that test signals are detected which, on the one hand, are highly likely to include the necessary error information and, on the other hand, may be evaluated advantageously for error localization and recognition, respectively.

An embodiment of the arrangement of testing components adapted to be configured individually in response to a particular case of application so as to optimize the method is obtained by applying a client-server process to form the master-server configuration in response to the current testing task and/or the further master-server configuration in response to the further current testing task.

The avantageous further developments disclosed in the dependent apparatus claims possess the same advantages as described in connection with the corresponding method features. More specifically, user friendliness of the testing apparatus is improved if the apparatus comprises display means for electronic output of the current electronic testing signals detected and/or the current electronic testing signals processed by the processing means and/or a user interface for detection of user inputs and/or output of user data.

The advantages of the method and apparatus devised for testing electronic signals in a network are highlighted above all when applied to a telecommunications network, such as a GSM network, a GPRS network, or a UMTS network.

The invention will be described further, by way of example, with reference to the accompanying drawings, in which:

FIG. 3 illustrates architecture as shown in FIG. 1, including testing components connected to individual network connections;

Figure 5:
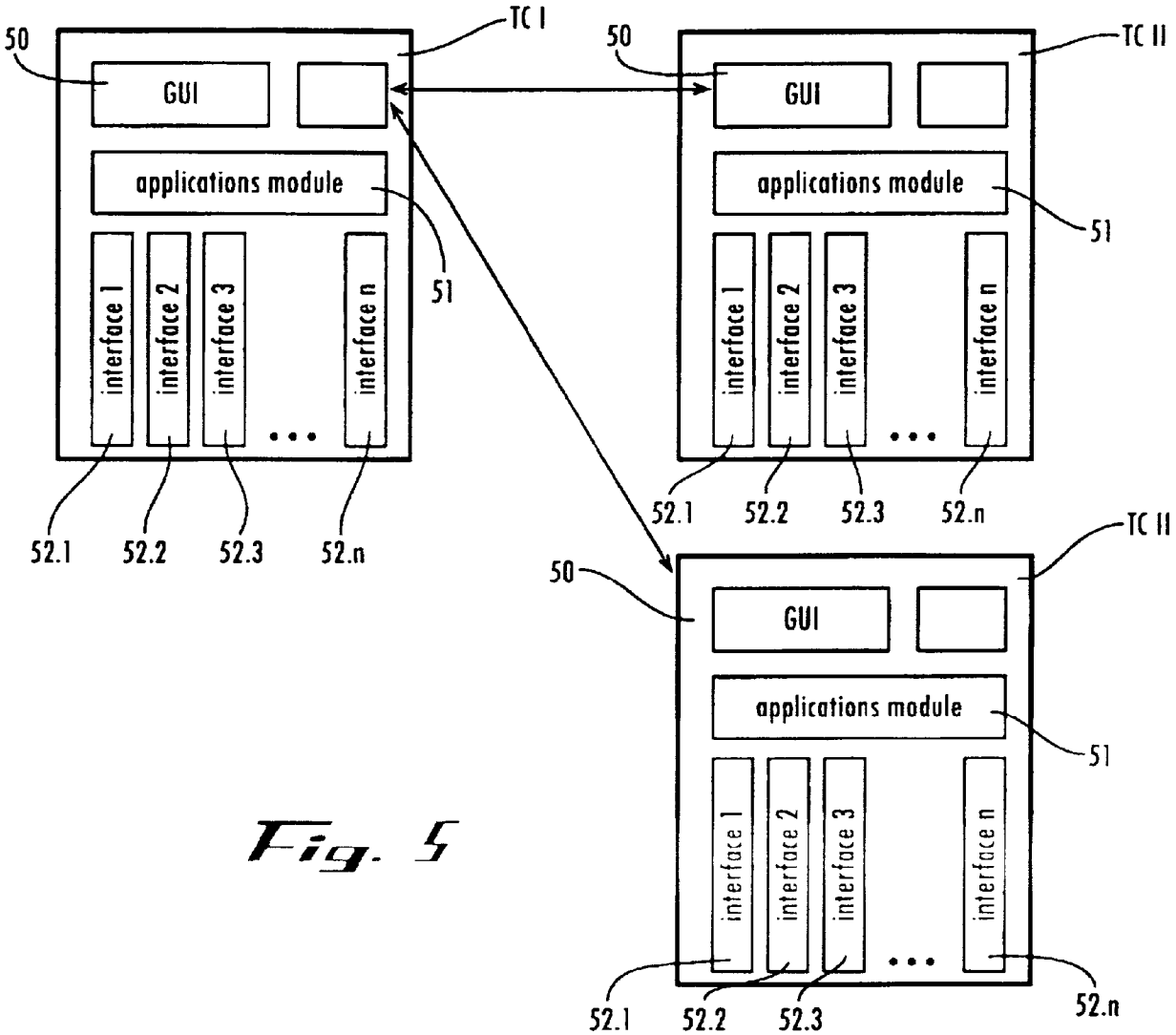

FIG. 5 presents block diagrams of a plurality of testing components; and

Figure 6:
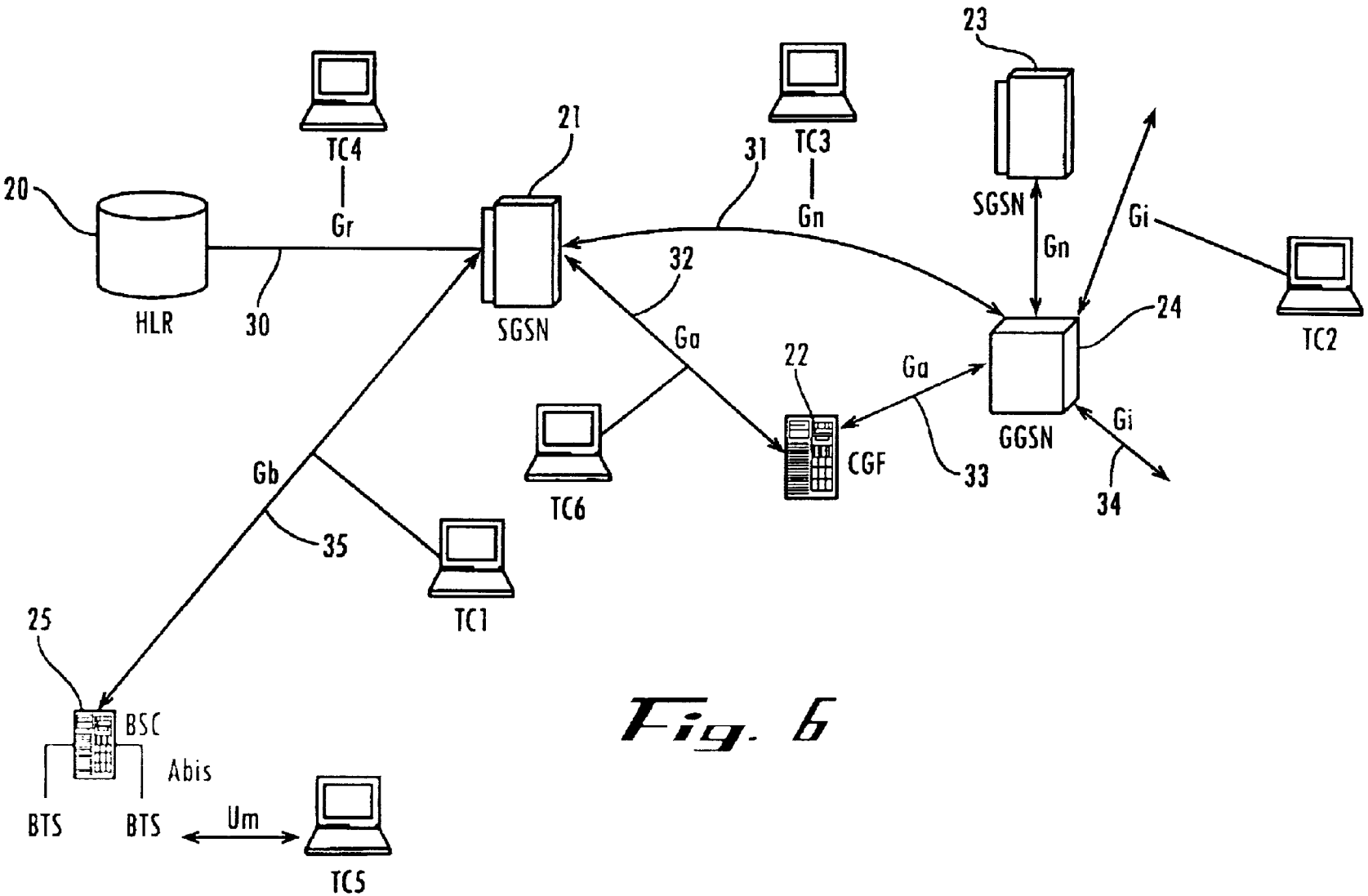

FIG. 6 illustrates architecture as shown in FIG. 3, including a plurality of testing components coupled to network connections.

Figure 1:
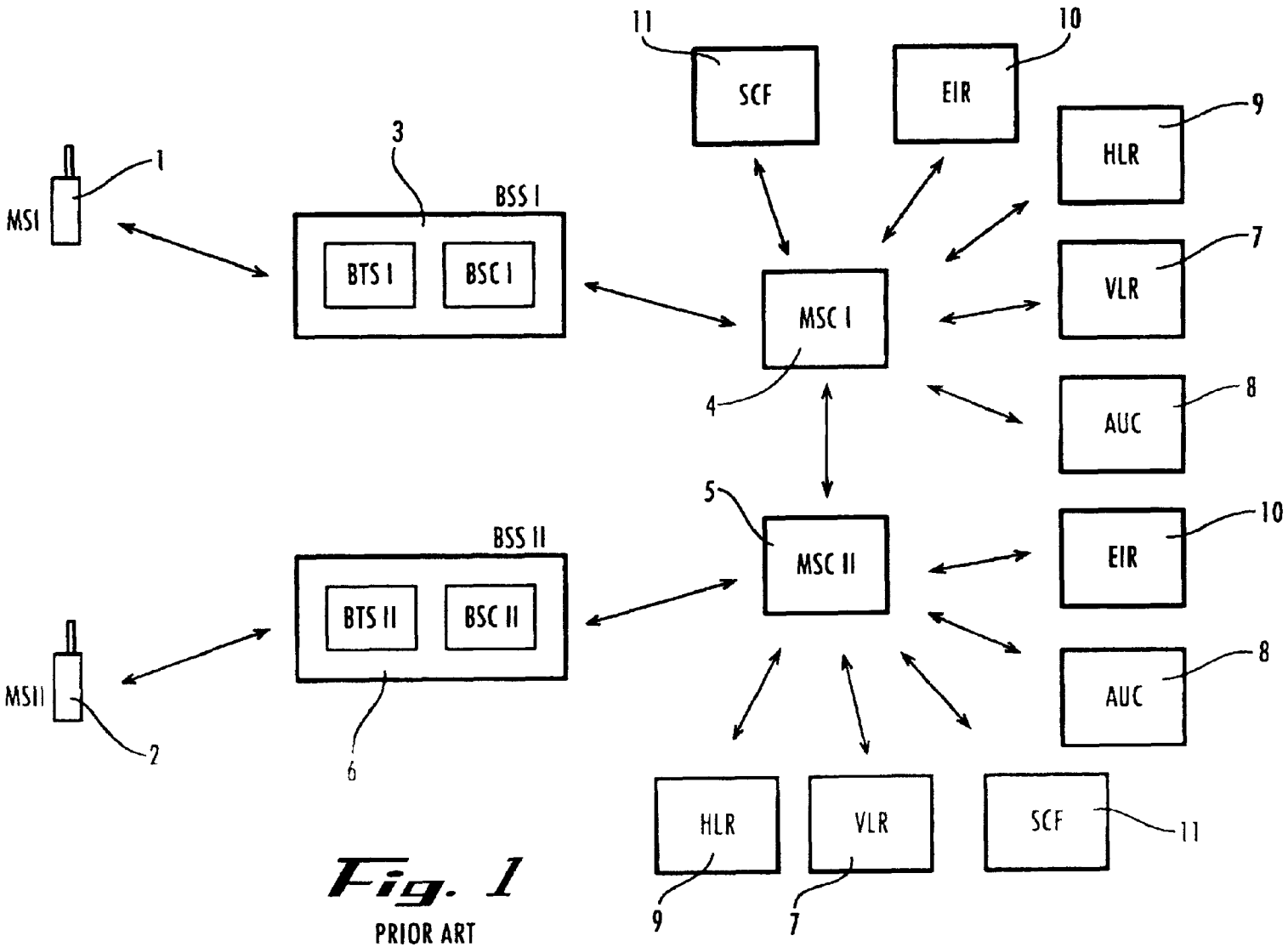
Fig. 1 PRIOR ART
FIG. 1 illustrates an example of network architecture according to the GSM standard.

FIG. 1 shows typical architecture of a network which utilizes the GSM standard for transmission of information. Mobile stations MSI, MSII (MS—Mobile Station) 1, 2 permit the respective user to access the GSM network. The mobile stations 1, 2 each consist of a mobile apparatus proper and a special user module (SIM—Subscriber Identity Module). Mobile station 1 may enter into contact with a BSSI (BSS—Base Station System of a radio cell) 3 for exchanging electronic data with the other mobile station 2, the BSSI constituting an interface to the mobile stations 1, 2 which can be reached by radio transmission, on the one hand, and to the fixed infrastructure of the GSM network, on the other hand. By their respective radio cells, one or more BSSs assure geographic radio coverage of the mobile communications network and set up individual connections to the freely moving mobile stations 1, 2, as may be required. A BSS may be subdivided further into one or more transmitter/receiver stations (BTS—Base Transceiver Station) and an associated central control means (BSC—Base Station Controller).

When mobile station 1 has made a connection to BSSI 3 a call request from mobile station 1 is passed on to a mobile switching means MSCI (MSC—Mobile Switching Center) 4. The MSCI 4 provides interfaces to the connected BSSs, other MSCs, data bases or registers 7, . . . 11 (VLR—Visited Location Register, HLR—Home Location Register, AUC—Authentification Register, EIR—Equipment Identification Register, SCF—Switching Control Function) and/or connected terminal equipment.

The call request from mobile station MSI 1 is passed on by establishing a connection between the mobile switching means MSCI 4 and another mobile switching means MSCII 5. Thereupon, this other mobile switching means MSCII 5 sets up a connection with another BSSII 6. Finally, a connection is made between the other BSSII 6 and the other mobile switching means MSCII 5. Thereupon electronic signals can be exchanged between mobile station MSI 1 and the other mobile station MSII 2.

Figure 2:
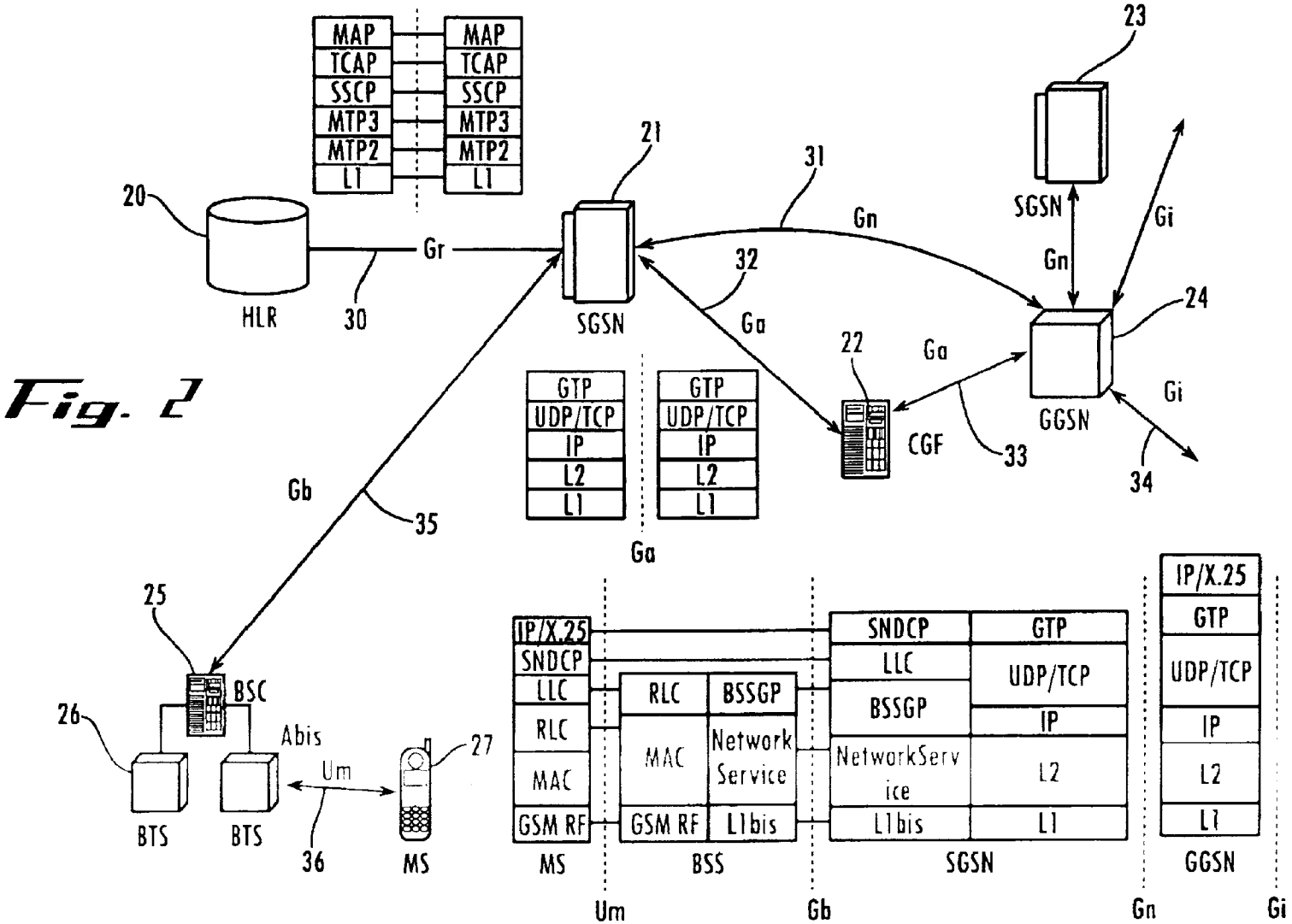
FIG. 2 shows a partial structure of a network according to the GPRS standard.
Figure 1:
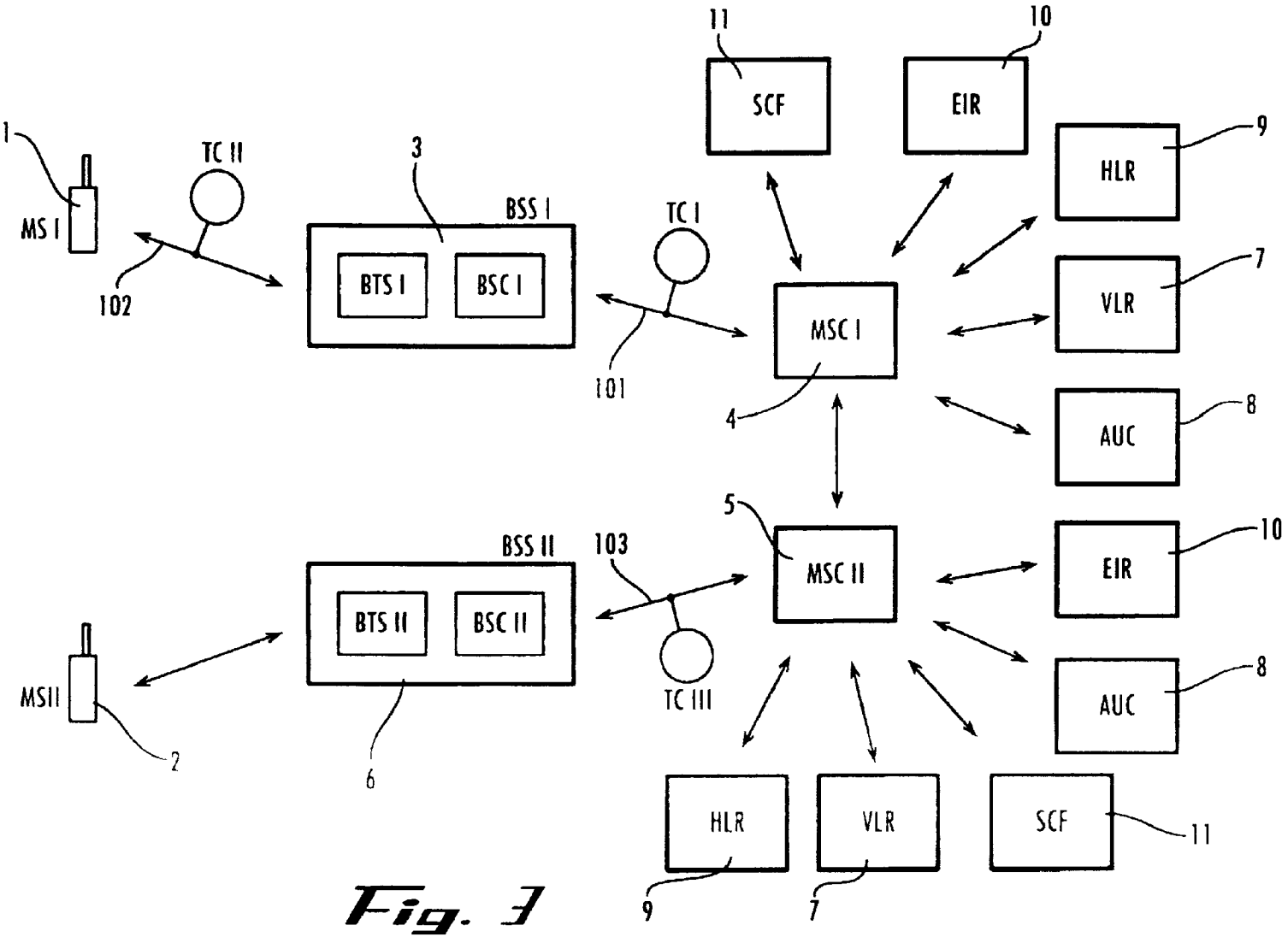

FIG. 2 shows an example of a partial structure of a network in which mobile communication takes place on the basis of the GPRS standard. In this case the electronic data exchange between network elements 20, . . . 27, e.g. between SGSN (Serving GPRS Support Node) and HLR (Home Location Register) is based on respective interface-related protocol standards. Examples of interface-related protocol standards are indicated in FIG. 2 by corresponding letters, such as Gr, Ga, Gn, or Gi. These designations characterize the transmission standard used on the respective associated network connections 30, . . . 36 as indicated in FIG. 2 by corresponding arrows. The respective data exchange is effected on different protocol levels or layers, such as GTP, MAP, . . . each fulfilling a respective function (cf. the lower right hand area in FIG. 2, for example).

FIG. 3 illustrates the architecture according to FIG. 1, wherein individual testing components TCI, TCII and TCIII, respectively, either stationary or portable ones, for example so-called test/check computers, are linked to individual connections within the architecture. The test components TCI, TCII, and TCIII, respectively, are able to detect electronic signals which are being exchanged through the respective connections 101, 102, or 103 in the network architecture. To this end the testing components TCI, TCII, and TCIII, respectively, comprise suitable measuring modules which are known as such for the network to be tested from the fields of measurement technology and diagnostics. The connections within the network architecture to which testing components are to be connected may be determined in dependence on a particular case of application. Statistic data, particularly on error frequency and load behavior, preferably may be drawn upon for selecting the connections to be checked. The testing components TCI, TCII, and TCIII, respectively, are configured by means of suitable software so that they will be useful for performing the particular testing task once linked to the respective connection 101, 102, or 103 in the network architecture.

Figure 4:
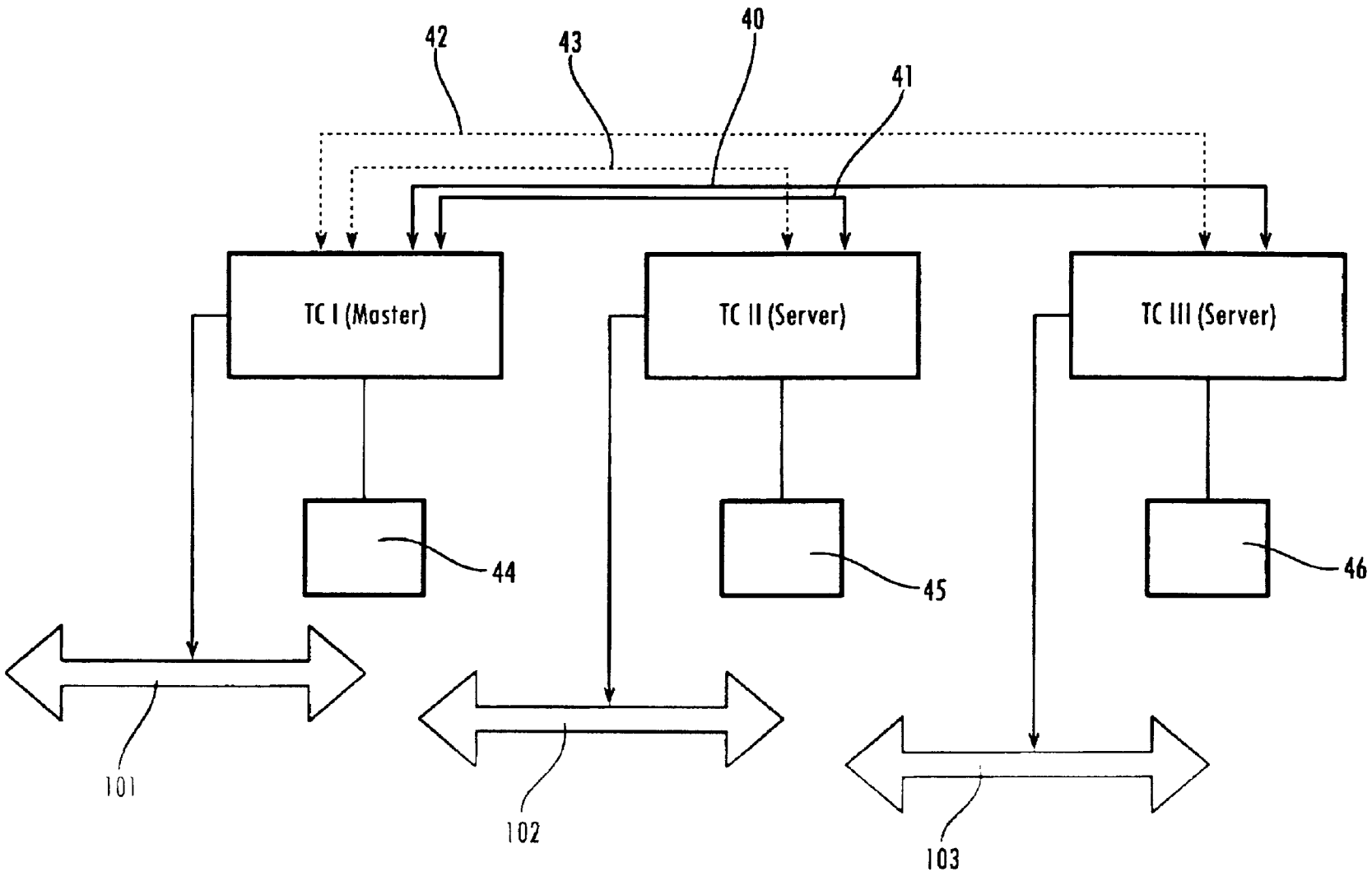
FIG. 4 is a diagrammatic presentation of a plurality of inter-connected testing components.

A respective signal and measurement data connection may be set up between the testing components TCI, TCII, and TCIII, respectively, in order to carry out a particular testing task. FIG. 4 diagrammatically shows signal and measurement data connections 40, 41 drawn in continuous lines between the testing components TCI, TCII, and TCIII. Let it be assumed, for example, that testing component TCI is assigned a master function for the testing task to be undertaken, while the other testing components TCII and TCIII are operated in a secondary mode (server mode and server mode, respectively)l. Fundamentally, however, each one of the testing components TCI, TCII, and TCIII may take over a master or a server function. The function of the respective testing component is determined electronically, depending on the testing task, by configuring the respective testing component TCI, TCII, or TCIII in accordance with the task to be performed. The configuration conveniently is effected by remote control as this is advantageous particularly with networks covering a wide distribution area.

In the case at issue, the testing component TCI configured as master testing means assumes control of the testing task. A control means of the master testing component TCI, comprising a processor and storage means, causing synchronization in time of the testing components TCI, TCII, and TCIII for carrying out the testing task so that triggering will be warranted in the context of the testing task. To this end, time standard signals are exchanged via synchronization connections 42, 43. An even more precise synchronization in time of the testing components TCI, TCII, and TCIII, respectively, (e.g. +/−20 ppm, depending on the transmission speed) can be achieved by means of a standard time transmitter or by a time standard which is receivable via satellite.

Once time synchronization has been effected automatically, the master testing component TCI initiates the testing procedure. In the course of the testing procedure all the testing components utilized in response to the particular testing task to be performed, sample test signals provided with a precise time stamp from the respective one of the connections 101, 102, and 103 to which they are linked. The test signals detected are transmitted by the server testing components TCII and TCIII to the master testing component TCI. In the master testing component TCI the test signals received are associated with one another in such a way that subsequently they can be evaluated by the master testing component TCI according to their hierarchy in time and function so that a test result may be derived from them. The processing/evaluating of the test signals detected also may be carried out, at least partly, in the server testing components TCII and TCIII already. In this way the test signals especially may be enhanced in part, such as by allowing for their time stamps.

The testing components TCI, TCII, and TCIII may be equipped, individually or all together, with means for generating simulation signals. These simulation signals are used to generate electronic signals which are coupled into the respective connection 101, 102, or 103. Electronic test signals or checking signals thus may be fed into the network and their transmission within the network may be recorded by means of other testing components TCI, TCII, TCIII. This permits verification of the automatic fault control and allows suitable countermeasures according to international standards.

As shown in FIG. 4, the testing components TCI, TCII, TCIII each are connected to a screen or display means 44, 45, and 46, respectively, which may be used for indicating test results. It is conceivable to provide for none or not all of the testing components TCI, TCII, TCIII to be connected to a means for display.

The distribution of the testing components TCI, TCII, TCIII throughout the network architecture so as to meet certain statistic requirements, for example, in terms of error frequency in certain network connections, as well as the flexible utilization of the testing components (master/server operation) depending on the specific testing task to be performed, have the great advantage that an application-specific testing procedure can be determined to be practiced even if individual testing components and/or individual network elements should fail. In case of failure of a testing component intended to act as master testing component, for instance, this task may be taken over by another testing component. In this manner, testing or checking system availability similar to that of the internet principle can be achieved.

FIG. 5 is a schematic presentation of block diagrams of inter-connected testing components TCI, TCII, and TCIII. The testing components TCI, TCII, and TCIII each comprise a user interface 50 (GUI—Graphical User Interface) for detection and output of user inputs. They further each comprise one or more application modules 51 for configuration of the testing component in accordance with the respective testing/measuring task to be performed, one or more testing interfaces or modules 52.1, 52.2 for detecting test signals, a synchronization interface 52.3 for receipt and/or transmission of synchronization signals, and an inter-communication interface 52.n. The types of interfaces used may vary in their specific design and number, depending on the particular case of application.

FIG. 6 illustrates an example of a connection of a plurality of testing components TC1, . . . TC6 in the partial structure of a mobile communications network as shown in FIG. 3. When performing a testing task, the plurality of testing components TC1, . . . TC6 exchange measurement data and other signals depending on the particular testing task through (virtual) intercommunication connections.

Although the invention was described above with reference to a telecommunications network, as an example, it is not limited to such a network. The method specified of testing/checking with the assistance of a plurality of testing components unfolds its advantageous consequences also in other networks in which a plurality of devices and means are interconnected in netlike fashion permitting electronic data to be exchanged through corresponding wired and/or wireless network connections. The testing components are adapted accordingly so as to be suitable for detection of the signals, e.g. process data transmitted in the respective network. Configuration of the master-server system is accomplished in the manner described above. The master-server system thus can be formed for testing and checking also in a network of energy or power plants as well as traffic or transportation engineering systems.

The features of the invention disclosed in the above specification, in the claims and drawings may be essential to implementing the invention in its various embodiments, both individually and in any combination.

What is claimed is:

1. A method of testing electronic signals in a network, comprising network units between which information can be exchanged by electronic data transmission through network connections, wherein a plurality of testing components are coupled each to one or more of the network connections so that the testing components each can detect electronic signals relating to the electronic data transmission through the one or more network connections to which the respective testing component is coupled, the method comprising the following steps:

establishing a test connection for exchange of electronic signals, including test and/or control signals, between one of the testing components and at least another one of the testing components in response to a current testing task, the one testing component being coupled to one network connection and the at least one other testing component being coupled to another network connection in the network;

establishing a master-server configuration in response to the current testing task, the one testing component being configured as a master testing component and the at least one other testing component being configured as a server testing component;

automatically synchronizing in time the master testing component and the server testing component:

electronically initiating detection of current electronic test signals by the master testing component on the other network connection by means of the server testing component and allocating electronic time information to the detected current electronic test signals in automatic consideration of the previously accomplished time synchronization;

processing the detected current electronic test signals and the allocated electronic time information by the server testing component and/or the master testing component in automatic consideration of the allocated electronic time information, and carrying out another current testing task upon termination of the current testing task, wherein another master-server configuration is established in response to the other current testing task, the at least one other testing component being configured as a master testing component and the one testing component being configured as a server testing component.

2. The method as claimed in claim 1, characterized in that establishment of the master-server configuration in response to the current testing task and/or establishment of the other master-server configuration in response to the other current testing task are limited to a predetermined period of time of which the duration depends on the current or other current testing task, respectively.

3. The method as claimed in claim 1, characterized in that a synchronization connection for automatic synchronization in time is established between the master testing component and the server testing component for exchanging synchronization signals.

4. The method as claimed in claim 3, characterized in that synchronization signals transmitted from the master testing component to the server testing component comprise time standard signals so that the automatic synchronizing in time is released by the master testing component.

5. The method as claimed in any one of claim 1, characterized in that time standard signals transmitted via radio connections are received by the master testing component and/or the server testing component for automatic synchronizing in time.

6. The method as claimed in claim 1, characterized in that electronic data of characteristics of the network are automatically taken into consideration in establishing the test connection and establishing the master-server configuration in response to the current testing task and/or in establishing the further master-server configuration in response to the further current testing task.

7. The method as claimed in claim 1, characterized in that the master-server configuration in response to the current testing task and/or the further master-server configuration in response in response to the further testing task are established by a client-server process.

8. A method as claimed in claim 1 wherein the network is a telecommunications network.

9. A method as claimed in claim 1 wherein the network is an energy supply net.

10. A method as claimed in claim 1 wherein the network is a network of traffic engineering systems.

11. A method as claimed in claim 1 wherein the network is a network of process engineering measurement/control systems.

12. A method of testing electronic signals in a network, comprising network units between which information can be exchanged by electronic data transmission through network connections, wherein a plurality of testing components are coupled each to one or more of the network connections so that the testing components each can detect electronic signals relating to the electronic data transmission through the one or more network connections to which the respective testing component is coupled, the method comprising the following steps:

establishing a test connection for exchange of electronic signals, including test and/or control signals, between one of the testing components and at least another one of the testing components in response to a current testing task, the one testing component being coupled to one network connection and the at least one other testing component being coupled to another network connection in the network;

establishing a master-server configuration in response to the current testing task, the one testing component being configured as a master testing component and the at least one other testing component being configured as a server testing component;

automatically synchronizing in time the master testing component and the server testing component;

electronically initiating detection of current electronic test signals by the master testing component on the other network connection by means of the server testing component and allocating electronic time information to the detected current electronic test signals in automatic consideration of the previously accomplished time synchronization; and processing the detected current electronic test signals and the allocated electronic time information by the server testing component and/or the master testing component in automatic consideration of the allocated electronic time information, wherein simulation signals are generated by means of the master testing component and fed into the network, electronic data of the simulation signals, including associated electronic simulation signal time information in response to the previously accomplished synchronizing in time, are stored in the master testing component, and the electronic data of the simulation signals stored in the master testing component are automatically taken into consideration in the processing of the current electronic test signals transmitted from the server testing component to the master testing component.

13. A method of testing electronic signals in a network, comprising network units between which information can be exchanged by electronic data transmission through network connections, wherein a plurality of testing components are coupled each to one or more of the network connections so that the testing components each can detect electronic signals relating to the electronic data transmission through the one or more network connections to which the respective testing component is coupled, the method comprising the following steps:

establishing a test connection for exchange of electronic signals, including test and/or control signals, between one of the testing components and at least another one of the testing components in response to a current testing task, the one testing component being coupled to one network connection and the at least one other testing component being coupled to another network connection in the network;

establishing a master-server configuration in response to the current testing task, the one testing component being configured as a master testing component and the at least one other testing component being configured as a server testing component;

automatically synchronizing in time the master testing component and the server testing component;

electronically initiating detection of current electronic test signals by the master testing component on the other network connection by means of the server testing component and allocating electronic time information to the detected current electronic test signals in automatic consideration of the previously accomplished time synchronization; and processing the detected current electronic test signals and the allocated electronic time information by the server testing component and/or the master testing component in automatic consideration of the allocated electronic time information, wherein further simulation signals are generated by means of the server testing component and fed into the network, electronic data of the further simulation signals, including associated electronic simulation signal time information in response to the previously accomplished synchronizing in time, are transmitted from the server testing component to the master testing component, and the electronic data of the further simulation signals transmitted from the server testing component to the master testing component are automatically taken into consideration in the processing of the current electronic test signals transmitted from the server testing component to the master testing component.

14. An apparatus for testing electronic signals in a network including network units between which information can be exchanged by electronic data transmission through network connections, the apparatus comprising connecting means for coupling to one or more of the network connections;

interface means for establishing a test connection with at least one other testing apparatus in response to a current testing task for exchanging electronic data, including test and/or control signals, with the at least one other testing apparatus;

configuration means for establishing a master-server configuration with the at least one other testing apparatus in response to the current testing task, the testing apparatus being configured as a master testing apparatus and the at least one other testing apparatus being configured as a server testing apparatus;

synchronizing means for time synchronization with the at least one other testing apparatus;

detecting means for detecting current electronic test signals relating to an electronic data transfer through the one or more network connections;

allocating means for automatically allocating electronic time information to detected current electronic test signals in automatic consideration of the time synchronization with the at least one other testing apparatus;

transmitting means for transmitting detected current electronic test signals and the allocated electronic time information to the at least one other testing apparatus; and processing means for processing the detected current electronic test signals and the allocated electronic time information, means for establishing another master-server configuration in response to another current testing task upon termination of the current testing task, the at least one other testing apparatus being configured as a master testing apparatus and the testing apparatus being configured as a server testing apparatus.

15. The apparatus as claimed in claim 14, characterized by display means for electronic output of the current electronic test signals detected and/or the current electronic test signals processed by the processing means.

16. The apparatus as claimed in claim 14, characterized by a user interface for detection of user inputs and/or for the output of user data.

17. The apparatus as claimed in claim 14, characterized by receiving means for receiving time standard signals which are transmitted via radio connections.

*18. A method of testing electronic signals in a network, comprising:*

*establishing a test connection between a first testing component and a second testing component, the first testing component being coupled to a first network connection and the second testing component being coupled to a second network connection in the network;*

*establishing a first master-server configuration for accomplishing a first current testing task, the first testing component being configured as a master testing component and the second testing component being configured as a server testing component;*

*electronically initiating detection of current electronic test signals on the second network connection by means of the second testing component and allocating electronic time information to the detected current electronic test signals;*

*processing the detected current electronic test signals and the allocated electronic time information;*

*terminating the first current testing task; and*

*carrying out a second current testing task, wherein a second master-server configuration is established such that the second testing component is configured as a master testing component and the first testing component is configured as a server testing component.*

*19. A method as recited in claim 18, further comprising automatically synchronizing in time the first testing component and the second testing component.*

*20. A method as recited in claim 19, further comprising establishing a synchronization connection between the first and second testing components for communicating synchronization signals.*

*21. A method as recited in claim 20, wherein time standard signals are transmitted from the first testing component to the second testing component.*

*22. A method as recited in claim 20, wherein time standard signals transmitted via radio connections are received by at least one of the first and second testing components.*

*23. A method as recited in claim 18, wherein establishment of the first master-server configuration is limited to a predetermined period of time of which the duration depends on the first current testing task.*

*24. A method as recited in claim 18, wherein data concerning characteristics of the network are automatically taken into consideration in establishing the test connection and establishing the first and second master-server configurations.*

*25. A method as recited in claim 18, wherein the first and second master-server configurations are established by a client-server process.*

* * * * *